United States Patent
Lee et al.

(10) Patent No.: US 10,185,760 B2
(45) Date of Patent: Jan. 22, 2019

(54) METHOD AND DEVICE FOR FORMING GROUP USING COMMUNICATION HISTORY INFORMATION

(71) Applicant: Samsung Electronics Co., Ltd., Suwon-si, Gyeonggi-do (KR)

(72) Inventors: Yoonkyong Lee, Seoul (KR); Sangho Yi, Seoul (KR); Muwoong Lee, Cheongju-si (KR); Seokjin Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 14/905,583

(22) PCT Filed: Jul. 15, 2014

(86) PCT No.: PCT/KR2014/006402
§ 371 (c)(1),
(2) Date: Jan. 15, 2016

(87) PCT Pub. No.: WO2015/009037
PCT Pub. Date: Jan. 22, 2015

(65) Prior Publication Data
US 2016/0162568 A1    Jun. 9, 2016

(30) Foreign Application Priority Data

Jul. 15, 2013    (KR) .................. 10-2013-0082845

(51) Int. Cl.
*G06F 17/30*    (2006.01)
*G06Q 10/10*    (2012.01)
*H04L 12/58*    (2006.01)

(52) U.S. Cl.
CPC ....... *G06F 17/30598* (2013.01); *G06Q 10/10* (2013.01); *G06Q 10/107* (2013.01); *H04L 51/16* (2013.01)

(58) Field of Classification Search
None
See application file for complete search history.

(56) References Cited

U.S. PATENT DOCUMENTS 7,039,639 B2    5/2006   Brezin et al.
9,224,158 B2 *  12/2015  Kritt ................. G06Q 30/0267
(Continued)

FOREIGN PATENT DOCUMENTS

CN    1578952 A      2/2005
CN    101616102 A   12/2009
(Continued)

OTHER PUBLICATIONS

Diana MacLean et al., Groups Without Tears: Mining Social Topologies from Email, Stanford University, 2011.
(Continued)

*Primary Examiner* — Hung D Le
(74) *Attorney, Agent, or Firm* — Jefferson IP Law, LLP

(57) ABSTRACT

When a communication occurs in an electronic device, groups are automatically generated according to the user's situation by: storing a communication history in a database; generating a first group from the database on the basis of the time and location information stored in the database at a predetermined time; retrieving a transmission list from the database and generating a second group from the database on the basis of an identifier of an opposing party included in the transmission list; retrieving a reception list from the database and generating a third group from the database on the basis of an identifier of an opposing party included in the reception list and the identifier of the opposing party (Continued)

included in the transmission list; and generating a fourth group on the basis of the information commonly included in at least two groups of the first group, the second group and the third group.

21 Claims, 9 Drawing Sheets

(56) References Cited

U.S. PATENT DOCUMENTS

| | | | |
|---|---|---|---|
| 9,542,255 B2* | 1/2017 | Fu | G06F 11/079 |
| 2006/0031772 A1 | 2/2006 | Valeski | |
| 2007/0001902 A1* | 1/2007 | Kuo | G01C 21/36 342/357.68 |
| 2007/0111704 A1 | 5/2007 | Linkert et al. | |
| 2009/0150562 A1* | 6/2009 | Kim | H04N 7/173 709/238 |
| 2009/0177484 A1* | 7/2009 | Davis | G06Q 30/02 705/346 |
| 2009/0204981 A1* | 8/2009 | Karino | G06F 11/2023 719/328 |
| 2009/0327438 A1 | 12/2009 | Cheng et al. | |
| 2011/0029887 A1 | 2/2011 | Pearson et al. | |
| 2011/0066973 A1* | 3/2011 | Plom | G06F 11/323 715/808 |
| 2011/0145245 A1 | 6/2011 | Choi | |
| 2012/0030211 A1* | 2/2012 | Cai | H04W 4/023 707/741 |
| 2012/0158935 A1 | 6/2012 | Kishimoto et al. | |
| 2013/0070814 A1* | 3/2013 | Lu | H04L 25/0212 375/219 |
| 2013/0103880 A1* | 4/2013 | Mehrotra | H04L 49/357 710/316 |
| 2013/0109363 A1 | 5/2013 | Yang et al. | |
| 2013/0142056 A1* | 6/2013 | Abplanalp | H04W 8/18 370/252 |
| 2013/0232007 A1* | 9/2013 | Kritt | G06Q 30/0267 705/14.58 |
| 2013/0315107 A1* | 11/2013 | Lindner | H04L 65/4061 370/277 |
| 2013/0315108 A1* | 11/2013 | Lindner | H04W 4/08 370/277 |
| 2014/0052640 A1* | 2/2014 | Pitroda | G06Q 20/02 705/67 |
| 2015/0334555 A1* | 11/2015 | Seo | H04W 84/18 370/254 |
| 2017/0111245 A1* | 4/2017 | Ishakian | G06Q 10/0633 |

FOREIGN PATENT DOCUMENTS

| | | |
|---|---|---|
| CN | 102857605 A | 1/2013 |
| CN | 103079006 A | 5/2013 |
| CN | 103180798 A | 6/2013 |
| EP | 2 369 536 A1 | 9/2011 |
| JP | 2005-236871 A | 9/2005 |
| KR | 10-2009-0038716 A | 4/2009 |
| KR | 10-2010-0111936 A | 10/2010 |
| KR | 10-1037854 B1 | 5/2011 |
| KR | 10-1078175 B1 | 10/2011 |
| KR | 10-2012-0012087 A | 2/2012 |

OTHER PUBLICATIONS

Chinese Office Action dated Nov. 5, 2018 issued in CN Application 2014800506350.

* cited by examiner

FIG. 5

| | ID 502 | TIME 504 | PLACE NAME 506 | PLACE CATEGORY 508 | LONGITUDE 510 | LATITUDE 512 | CORRESPONDENT IDENTIFIER 514 | TYPE 516 | CALL TYPE 518 | |
|---|---|---|---|---|---|---|---|---|---|---|
| 520 | 1 | 20130531, 12:23:42 | HOME MART | HOME | 127.5 | 32.4 | ALICE | TRANSMISSION | VOICE | ⋮ |
| 522 | 2 | 20130531, 13:42:23 | FITNESS CENTER | HOME | 127.5 | 32.4 | HOME | RECEPTION | VOICE | ⋮ |
| 524 | 3 | 20130531, 14:32:23 | R2 | COMPANY | 129.5 | 33.6 | GREG | RECEPTION | VIDEO | ⋮ |
| 526 | 4 | 20130531, 16:27:54 | GANGSEO-GU OFFICE | 관공서 | 125.2 | 35.7 | FIONA | TRANSMISSION | VOICE | ⋮ |
| | ⋮ | ⋮ | ⋮ | ⋮ | ⋮ | ⋮ | ⋮ | ⋮ | ⋮ | ⋮ |

FIG. 6

| ID 602 | TIME 604 | PLACES 606 | PLACE CATEGORY 608 | LONGITUDE 610 | LATITUDE 612 | CORRESPONDENT ID 614 | TYPE 616 |
|---|---|---|---|---|---|---|---|
| 1 | 20130421 10:21:42 | R3 | HOME | 127.5 | 32.4 | ALICE, JON, MATTHEW, ESTHER, JOHN | RECEPTION |
| 2 | 20130430 10:25:23 | FITNESS CENTER | HOME | 127.5 | 32.4 | RACHEL, ESTHER, SCARLETT | TRANSMISSION |
| 3 | 20130501 14:30:23 | R2 | COMPANY | 129.5 | 33.6 | GREG, PETER, FIONA | RECEPTION |
| 4 | 20130502, 13:24:54 | YOUNTONG-GU OFFICE | PUBLIC OFFICE | 125.2 | 35.7 | ALICE, JOHN, PETER, NAOMI | TRANSMISSION |
| 5 | 20130502, 14:42:21 | R2 | COMPANY | 129.5 | 33.6 | ISAAC, ESAU, JACOB, ABRAHAM | RECEPTION |
| ... | ... | ... | ... | ... | ... | ... | ... |

620 — row 1
622 — row 2
624 — row 3
626 — row 4
628 — row 5

METHOD AND DEVICE FOR FORMING GROUP USING COMMUNICATION HISTORY INFORMATION

TECHNICAL FIELD

Embodiments of the present invention relate to a method and apparatus for collecting and analyzing records created when an electronic device performs communication, and creating and classifying groups based on the user's conditions at the time of communication.

BACKGROUND ART

Electronic devices such as mobile terminals have a basic function that allows users to communicate with each other. Electronic device users store and manage people's contact information in the electronic devices in a form of addresses, with telephone numbers, SMS IDs, MMS IDs, E-mail addresses, SNS IDs, etc.

Electronic devices detect that a communication event occurs and stores the communication-related records in a database. Electronic devices are capable of: analyzing communication records (communication histories) stored in the database at a preset time to detect times when communication events occurred, information regarding locations, and information regarding corresponding recipients; automatically classifying hundreds of recipients stored in the database into corresponding groups, using the detection results; and providing proper names to the classified groups, thereby providing user convenience.

DISCLOSURE OF INVENTION

Technical Problem

Embodiments of the present invention are capable of extracting a group of people related to the user, based on communication records when an electronic device communicates with other electronic devices and the user's conditions at the time of communication.

Embodiments of the present invention are capable of creating, when a communication event occurs in an electronic device, a group using the time, the location, contact information regarding the recipient and the sender, information regarding co-recipients, etc.

Embodiments of the present invention are capable of creating a group of related users, using existing communication records, without information regarding a relationship between explicit users.

Solution to Problem

In accordance with an aspect of the present invention, a method of creating groups using communication records of an electronic device is provided. The method includes: storing the communication records in a database; creating a first group from the database based on time and location information stored in the database when a preset time arrives; retrieving a transmission list from the database, and creating a second group from the database based on correspondent identifiers included on the transmission list; retrieving a reception list from the database, and creating a third group from the database based on correspondent identifiers included on the reception list and correspondent identifiers included on the transmission list; and creating a fourth group based on information that is commonly included in at least two of the first, second and third groups.

Preferably, the communication record includes: an ID, a time, a location, a correspondent identifier, and type information. The correspondent identifier includes information regarding a number of recipients. Type information includes: transmission or reception. The correspondent identifier includes: information regarding a number of recipients.

Preferably, the creation of a first group includes: determining, as a group, an event log of which the time and location information is included within a predetermined range. The creation of a third group includes: determining an event log of the reception list as a group when one of the correspondent identifiers in the reception list is identical to the correspondent identifier in the transmission list.

Preferably, the creation of a fourth group includes: creating the fourth group based on group information that is designated by a user and included in an address book. The creation of a fourth group includes: creating the fourth group based on domain names included in email addresses of the address book.

In accordance with another aspect of the present invention, a method of creating groups using communication records of an electronic device is provided. The method includes: storing the communication records in a database; detecting conditions of the electronic device from the database; and creating groups based on an address book and the conditions. The detection of conditions includes: determining the conditions based on at least one of the following: a time, a location, a correspondent identifier stored in the database.

In accordance with another aspect of the present invention, a method of displaying an address book of an electronic device is provided: The method includes: displaying, on a screen, a list of items including at least one of the following: a name, a phone number, and an email address; and displaying both the item and group information related to the item, based on a user's current condition.

Preferably, the group information includes: information regarding a first group, wherein the first group is created from a database where communication records are stored, based on time and location information.

Preferably, the group information includes: information regarding a second group, wherein the second group is created from a database where communication records are stored, based on correspondent identifiers included in a transmission list retrieved from the database. The group information includes: information regarding a third group, wherein the third group is created from a database where communication records are stored, based on correspondent identifiers included in a reception list retrieved from the database and correspondent identifiers included in a transmission list. The group information includes: information regarding a fourth group, wherein the fourth group is created based on information that is commonly included in at least two of the following: a first group that is created from a database where communication records are stored, based on time and location information; a second group that is created from the database, based on correspondent identifiers included in a transmission list retrieved from the database; and a third group that is created from the database, based on correspondent identifiers included in a reception list retrieved from the database and correspondent identifiers included in the transmission list. The creation of a fourth group includes: creating the fourth group based on group information that is designated by a user and included in an address book. The creation of a fourth group includes:

creating the fourth group based on domain names included in email addresses of the address book.

In accordance with another aspect of the present invention, an electronic device is provided. The electronic device includes: a communication unit; a storage unit with a database where communication records are stored when events occur in the communication unit; and a processor for: creating a first group from the database based on time and location information stored in the database when a preset time arrives; retrieving a transmission list from the database, and creating a second group from the database based on correspondent identifiers included on the transmission list; retrieving a reception list from the database, and creating a third group from the database based on correspondent identifiers included on the reception list and correspondent identifiers included on the transmission list; and creating a fourth group based on information that is commonly included in at least two of the first, second and third groups.

Preferably, the communication record includes: an ID, a time, a location, a correspondent identifier, and type information. The processor determines, as the first group, an event log of which the time and/or location information is included within a predetermined range. When one of the correspondent identifiers in the reception list is identical to the correspondent identifier in the transmission list, the processor determines an event log of the reception list as the third group.

Advantageous Effects of Invention

As described above, when a communication event occurs in an electronic device, the electronic device and the method according to the present invention performs the following: storing the communication records in a database; creating a first group from the database based on time and location information stored in the database when a preset time arrives; retrieving a transmission list from the database, and creating a second group from the database based on correspondent identifiers included on the transmission list; retrieving a reception list from the database, and creating a third group from the database based on correspondent identifiers included on the reception list and correspondent identifiers included on the transmission list; and creating a fourth group based on information that is commonly included in at least two of the first, second and third groups.

The electronic device displays information regarding the created groups on the screen, according to the user's inputs, while displaying the address book, and provides the user with the groups information along with contact information, thereby providing contact information based on the user's conditions

BRIEF DESCRIPTION OF DRAWINGS

FIG. 5 is a diagram showing a call log stored in the phonebook database.

FIG. 6 is a diagram showing a message log stored in the communication record database.

MODE FOR THE INVENTION

Figure 1:
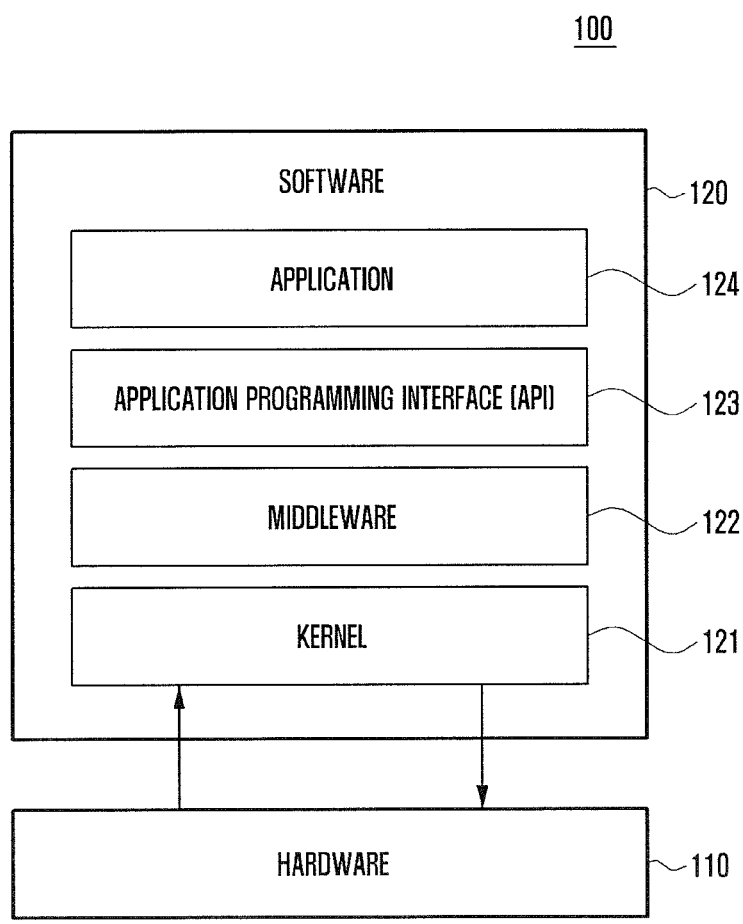
FIG. 1 is a block diagram of an electronic device according to the present invention.

Embodiments of the present invention and the modifications are described in detail with reference to the accompanying drawings. It should be understood that the present invention is not limited to the embodiments.

In the drawings, the same or similar elements are denoted by the same reference numerals even though they are depicted in different drawings.

Singular forms used in the description and the claims are intended to include plural forms unless the context clearly indicates otherwise.

In the description, the expression "and" is also used in the sense of a combination of listed items.

In should be understood that the methods according to the present invention may also be modified from the following embodiments as part of the processes are altered or particular part of the processes are repeated or omitted.

Hereinafter, the present disclosure is described in detail with reference to the accompanying drawings FIG. 1 is a block diagram of an electronic device 100 according to the present invention.

Referring to FIG. 1, the electronic device 100 is capable of including hardware 110 or software 120. An embodiment of the hardware 110 will be described in detail later referring to FIG. 2. The software 120 is capable of including a kernel 121, middleware 122, application programming interface (API) 123 or application 124. An embodiment of the software 120 is described in detail referring to FIG. 3.

Examples of the electronic device 100 are: an electronic clock, refrigerator, air conditioner, vacuum cleaner, artificial intelligence robot, TV, digital video disk (DVD) player, audio system, oven, microwave oven, washing machine, electronic bracelet, electronic necklace, air purifier, digital photo frame, various medical devices (e.g., magnetic resonance angiography (MRA), magnetic resonance imaging (MRI), computed tomography (CT) scanner, ultrasonic wave device, etc.), navigation device, black box, set-top box, electronic dictionary, automotive equipment, electronic equipment for ships, avionics device, security device, electronic clothes, electronic key, machines related to agriculture, stock and marine products, desktop personal computer (desktop PC), laptop personal computer (laptop PC), personal digital assistant (PDA), portable multimedia player (PMP), tablet personal computer (tablet PC), mobile phone, video phone, smartphone, e-book reader, camera, wearable device, wireless device, global positioning system receiver (GPS receiver), hand-held device, MP3 players, camcorder, game console, wrist watch, head-mounted display (HMD), flat panel device, digital picture frame, electronic board, electronic signature receiving device, projector, etc. It should be understood that the types of electronic device according to the present disclosure are not limited to the above-listed devices.

Figure 2:
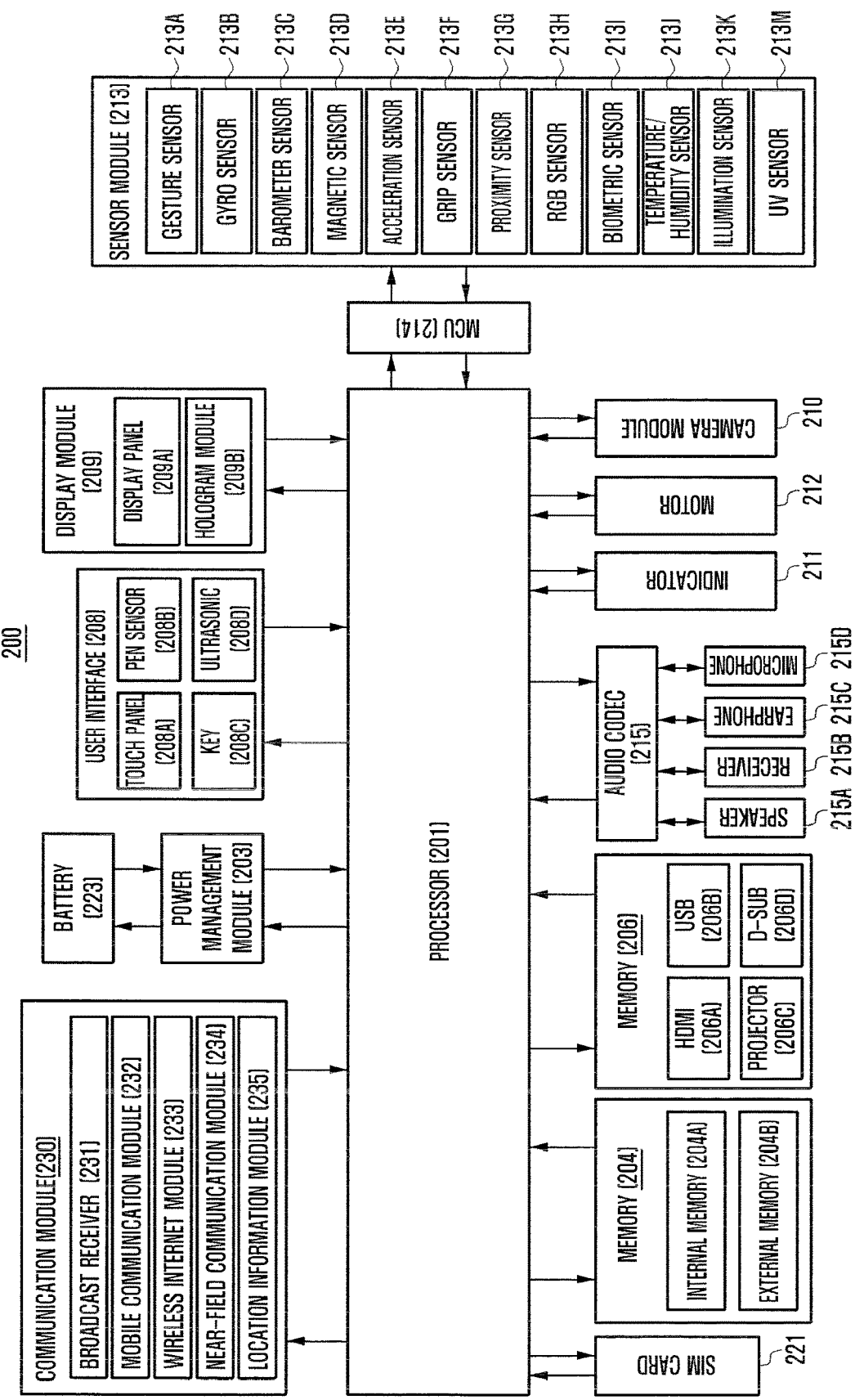
FIG. 2 is a block diagram of a hardware device according to the present invention.

FIG. 2 is a block diagram of a hardware device 200 (e.g., hardware 110 shown in FIG. 1) according to the present invention. Referring to FIG. 2, the hardware 200 is capable of including one or more processor 201. For example, as shown in FIG. 2, the processor 201 is capable of including: one or more application processors (APs) 201A and one or more communication processors (CPs) 201B. The AP 201A refers to a processor that is capable of: driving an operating system or an application program to control a number of hardware or software components connected to the AP 201A; and processing and operating various data including multimedia data. The AP 201A may be implemented as a system on chip (SoC). According to an embodiment, the AP 201 may further include a graphic processing unit (GPU) (not shown).

The CP 201B refers to a processor that is capable of performing a communication function of the electronic device including the hardware 200 (e.g., the electronic device 100 with the hardware 110). The CP 201B may be implemented as a system on chip (SoC). According to an embodiment, the CP 201B may also perform at least part of the multimedia control function. The CP 201B is capable of identifying and authenticating terminals in a communication network using a subscriber identification module (SIM), e.g., an SIM card 221, and providing users with services, such as a voice call, video call, SMS, data packets, etc. The CP 201B is also capable of controlling a radio frequency (RF) unit 205 to perform transmission/reception of data. Although the embodiment shown in FIG. 2 is implemented in such a way that the CP 201B, power management module 203, memory 204, etc. are separated from the AP 201A, it may be implemented in such a way that the AP 201A includes at least part of the listed components (e.g., the CP 201B).

The RF unit 205 is capable of the transmission/reception of data, e.g., RF signals or electromagnetic wave signals. Although it is not shown, the RF unit 205 is capable of including a transceiver, a Power Amp Module (PAM), a frequency filter, a Low Noise Amplifier (LNA), etc. The RF unit 205 may also include parts for transmitting/receiving electromagnetic waves, e.g., conductors, wires, etc., via free space during wireless communication.

The hard hardware 200 is capable of including an internal memory 204A or external memory 204B. The internal memory 204A is capable of including one or more of the following: volatile memory, e.g., dynamic RAM (DRAM), static RAM (SRAM), synchronous dynamic RAM (SDRAM), etc.; and non-volatile memory, e.g., one time programmable ROM (OTPROM), programmable ROM (PROM), erasable and programmable ROM (EPROM), electrically erasable and programmable ROM (EEPROM), mask ROM, flash ROM, etc. In an embodiment of the present invention, the AP 201A or the CP 201B may load commands or data, received from a nonvolatile memory or from at least one of the other elements, connected thereto respectively, into a corresponding volatile memory to process them. Additionally, the AP 201A or the CP 201B may store data, received from or created at one or more of the other elements, in the nonvolatile memory.

The external memory 204B may further include: compact flash (CF), secure digital (SD), micro-secure digital (micro-SD), mini-secure digital (mini-SD), extreme digital (XD), a memory stick, etc.

The power management module 203 is capable of managing electric power of the hardware 200. Although it is not shown, the power management module 203 is capable of including a Power Management Integrated Circuit (PMIC), a charger integrated circuit (charger IC), or a battery gauge. The PMIC may be implemented in the form of IC chip or SoC. Charging electric power may be performed in wired or wireless mode. The charger IC may charge a battery, preventing input over-voltage or input over-current from inputting to the battery from a charger. In an embodiment of the present invention, the charger IC may be implemented with wired charging type and/or wireless charging type. Examples of the wireless charging type of charger IC are a magnetic resonance type, a magnetic induction type, an electromagnetic type, etc. If the charger IC is a wireless charging type, it may include an additional circuit for wireless charging, e.g., a coil loop unit, a resonance circuit, a rectifier, etc. The battery gauge may measure the residual amount of battery 223, the level of voltage, the level of current, temperature during the charge. The battery 223 may generate electric power and supply it to the electronic device. The battery 223 may be a rechargeable battery.

The interface 206 may include at least one of the following: an HDMI (mHL) 206A, universal serial bus (USB) 206B, projector 206C, D-subminiature (D-sub) 206D, secure Digital (SD)/multi-media card (MMC) (not shown), and infrared data association (IrDA, not shown).

The communication module 230 is capable of providing a wireless communication function via a radio frequency. The communication module 230 is capable of including one or more of the following: WiFi 207A, Bluetooth (BT) 207B, GPS 207C, near field communication (NFC) 207D. Additionally or alternatively, the communication module 230 is also capable of including a network interface, a modem, etc. in order to connect the hardware 200 to a network. Examples of the network are Internet, local area network (LAN), wire area network (WAN), telecommunication network, cellular network, satellite network, plain old telephone service (POTS), etc.

The user interface 208 is capable of receiving instructions from the user. The user interface 208 is capable of including one or more of the following: a touch screen panel 208A, a pen sensor 208B (i.e., a digital pen sensor), a key 208C and an ultrasonic input system 208D. The touch screen panel 208A may sense touches in one or more of the following: capacitive sensing mode, pressure sensing mode, infrared sensing mode, and ultrasonic sensing mode. The touch screen panel 208A may further include a controller (not shown). When the touch screen panel 208A is designed to operate in capacitive sensing mode, it can sense direct touches or proximity of an object. The touch screen panel 208A may further include a tactile layer. In that case, the touch screen panel 208A can provide tactile feedback to the user. The pen sensor 208B (i.e., digital pen sensor) may be implemented in the same or similar fashion as receiving a user's touch input or by using a separate recognition sheet. The key 208C may include a key pad or a touch key. The ultrasonic input system 208D refers to a device that is capable of sensing sound waves via a microphone (e.g., a microphone 215D) of the electronic device by using a pen tool configured to generate ultrasonic signals, and detecting the data in wireless mode. In embodiments of the present invention, the hardware 200 may receive a user's inputs from an external system (e.g., a network, a computer or server) via the communication module 230.

The display module 209 refers to a device configured to show videos or display data. The display module 209 may include a panel 209A or a hologram module 209B. The panel 209A may be implemented with a Liquid Crystal Display (LCD), Active-Matrix Organic Light Emitting Diodes (AM-OLEDs), or the like. The display module 209 may further include a controller for controlling the panel 209A. The panel 209A may be implemented in a flexible, transparent, or wearable form. The panel 209A may form a single module with the touch screen panel 208A. The hologram module 209B shows a stereoscopic image in the air using interference of light.

The camera module 210 is capable of taking still images or moving images. In an embodiment, the camera module 210 may include one or more image sensors (e.g., front side lens or back side lens), an image signal processor (ISP), a flash LED, or the like.

The indicator 211 shows states of the hardware 200 or of the parts (e.g., AP 210A), e.g., a booting state, a message state, a recharging state, etc. The motor 212 converts an electrical signal into a mechanical vibration.

The sensor module 213 is capable of including: a gesture sensor 213A, gyro sensor 213B, barometer sensor 213C, magnetic sensor 213D, acceleration sensor 213E, grip sensor 213F, proximity sensor 213G, red-green-blue (RGB) sensor 213H, biometric sensor 213I, temperature/humidity sensor 213J, illuminance sensor 213K, and ultraviolet (UV) sensor 213M. The sensor module 213 may also include E-nose sensor, electromyography (EMG) sensor, electroencephalogram (EEG) sensor, electrocardiogram (ECG) sensor, fingerprint sensor, etc., which are not shown. In an embodiment, the hardware 200 further includes a micro controller unit (MCU) 214 for controlling the sensor module 213.

The audio codec 215 is capable of conversion between voices and electrical signals. The audio codec 215 is capable of performing conversion of voices, input or output via a speaker 215A, a receiver 215B, earphones 215C, a microphone 215D, etc. Although it is not shown, the hardware 200 may further include a processor (e.g., GPU) for supporting a mobile TV. The processor for supporting a mobile TV may process media data that comply with standards of digital multimedia broadcasting (DMB), digital video broadcasting (DVB), media flow, etc.

Each of the elements/units of the hardware according to the present disclosure may be called different names according to the various types of electronic devices. The hardware according to the present disclosure may be configured to include one or more elements described above. The hardware may also be modified in such a way as to: remove part of the elements or include new elements.

Figure 3:
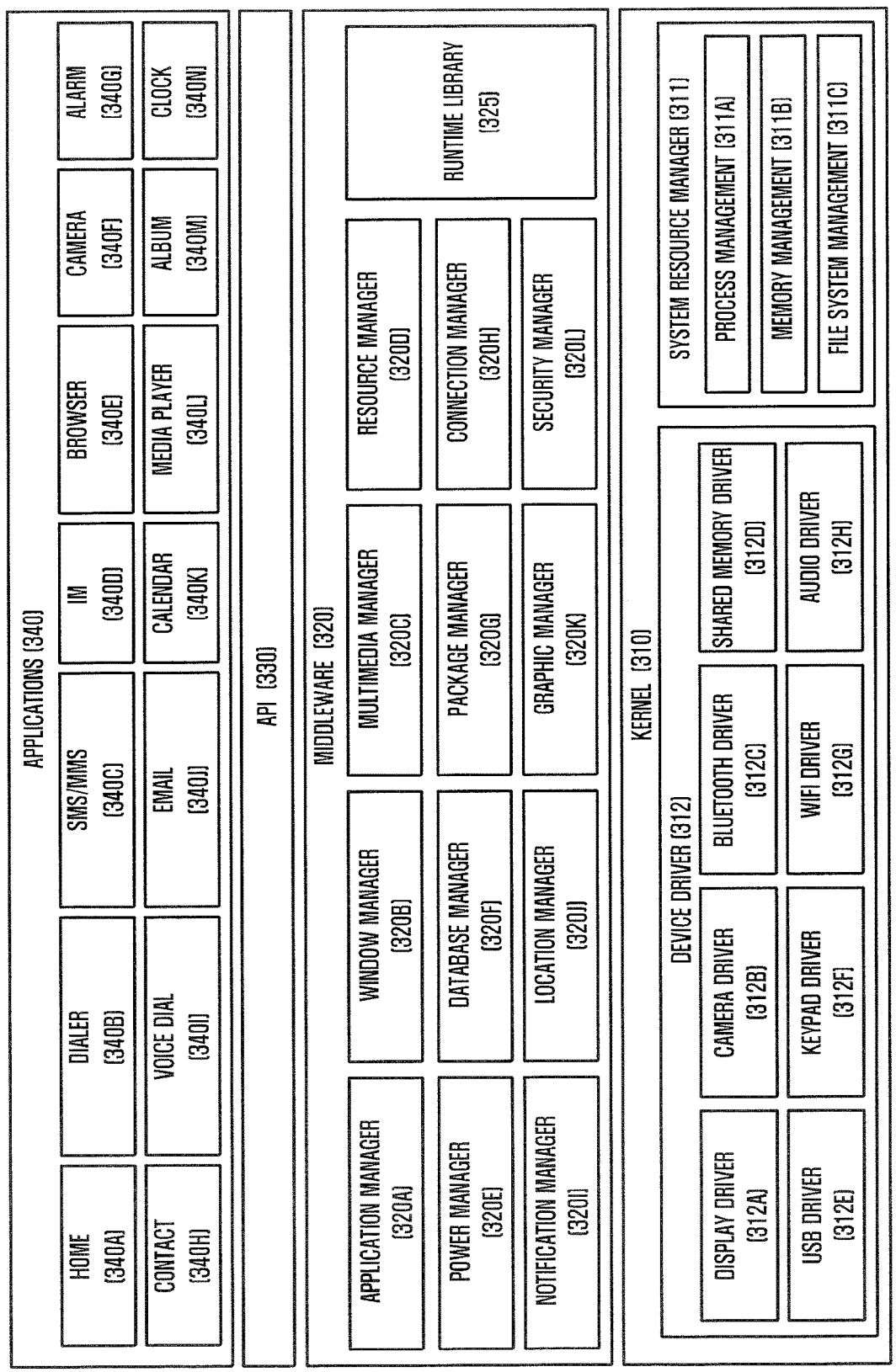
FIG. 3 is a block diagram of software according to the present invention.

FIG. 3 is a block diagram of software 300 (e.g., software 120 shown in FIG. 1) according to the present invention. The software 300 is implemented on the hardware (e.g., hardware 200), and is capable of including an operation system (OS) for controlling resources related to the electronic device (e.g., electronic device 100) or various applications (e.g., application 340) running on the OS. The OS may be, for example, Android, iOS, Windows, Symbian, Tizen, Bada, etc.

The kernel 310 is capable of including a system resource manager 311 for managing resources or a device driver 312. The system resource manager 311 is capable of including a process management 311A, a memory management 311B, a file system management 311C, etc. The system resource manager 311 is capable of performing control, allocation, reclamation, etc. on system resources.

The device driver 312 is capable of accessing and controlling various components of the hardware of a corresponding electronic device (e.g., hardware 200 of the electronic device 100) in terms of software. To this end, although it is not shown, the device driver 312 may be divided into an interface and a module of individual drivers provided by corresponding hardware companies. For example, the device driver 312 is capable of including one or more of the following: a display driver 312A, camera driver 312B, Bluetooth driver 312C, shared memory driver 312D, USB driver 312E, keypad driver 312F, WiFi driver 312G, audio driver 312H and inter-process communication (IPC) driver (not shown).

The middleware 320 may be configured to include a number of modules that have been implemented for providing functions that various applications commonly need. The middleware 320 is capable of providing the application 340 with functions that the application 340 commonly needs, through the API 330, so that the application 340 can efficiently use limited internal system resources of the electronic device. The middleware 320 is capable of including one or more of the following modules: an application manager 320A, window manager 320B, multimedia manager 320C, resource manager 320D, power manager 320E, database manager 320F, package manager 320G, etc.

The application manager 320A is capable of managing the life cycle of at least one of the applications in the application 340. The window manager 320B is capable of managing GUI resources used for the screen. The multimedia manager 320C is capable of detecting a format to play back various media files and encoding or decoding a media file by using a codec corresponding to the format. The resource manager 320D is capable of managing resources of at least one of the applications in the application 340, such as a source code, memory, storage space, etc. The power manager 320E is capable of managing the battery or the electric power source, based on the operation with the basic input/output system (BIOS), etc., and providing electric power information required for the operations. The database manager 320F is capable of creating, retrieving or altering a database to be used by at least one of the applications in the application 340. The package manager 320G is capable of managing the installation of update of applications distributed in the form of package file.

According embodiments, the middleware 320 may further include one or more of the following: a connectivity manager 320H, notification manager 320I, location manager 320J, graphic manager 320K and security manager 320L.

The connectivity manager 320H is capable of managing the wireless connectivity, such as Wi-Fi, Bluetooth, etc. The notification manager 320I is capable of displaying or notifying the user of events such as a received message, a schedule, a proximity notification, etc., in a mode without disturbing the user. The location manager 320J is capable of managing the location information regarding the electronic device. The graphic manager 320K is capable of managing a graphic effect to be provided to the user or a user interface related to the graphic effect. The security manager 320L is capable of providing various security functions required for the system security, the user authentication, etc.

When the electronic device (e.g., electronic device 100) includes a phone function, the middleware 320 may further include a telephony manager (not shown) for managing a voice or video call function in the electronic device.

In the embodiment, the middleware 320 is capable of including a runtime library 325 or other library modules (not shown). The runtime library 325 refers to a library module that a complier uses to add new functions via a programming language during execution of the applications. For example, the runtime library 325 is capable of performing the inputting/outputting operation, memory management, implementation of arithmetic functions, etc. The middleware 320 may create new middleware modules by combining the internal modules listed above in terms of function and uses the created modules. The middleware 320 may provide modules specialized according to types of operating systems in order to provide distinctive functions.

In addition, the middleware 320 may be adaptively configured to remove part of the existing components or to include new components. Therefore, the embodiment of the present disclosure may be modified in such a way to: omit part of the components, further include other components, or replace the existing component with other component that is called a different name but has a similar function thereto.

The API 330 is a set of API programming functions and may be provided in different configurations according to types of operating systems. For example, when the operating system is Android or iOS, each platform may be provided with one API set; and when the operation system is Tizen, each platform may be provided with two or more API sets.

The application 340 refers to one or more applications which are implemented in a corresponding electronic device (e.g., electronic device 100) using the API 330. The application 340 is capable of including a preloaded application or a third party application. The application 340 is capable of including at least one of the following applications: a home 340A for returning to the home screen, a dialer 340B, a short message server (SMS)/multi-media message service (MMS) 340C, an instant message (IM) 340D, a browser 340E, a camera 340F, an alarm 340G, a contacts (or address book) 340H, a voice dial 340I, an email 340J, a calendar 340K, a media player 340L, an album 340M, and a clock 340N.

The name of components in the software in the present disclosure may vary according to types of operation systems. The software according to the present disclosure may also be implemented in such a way as to: include at least one of the components described above; exclude part of the components; or further include other components.

Figure 4:
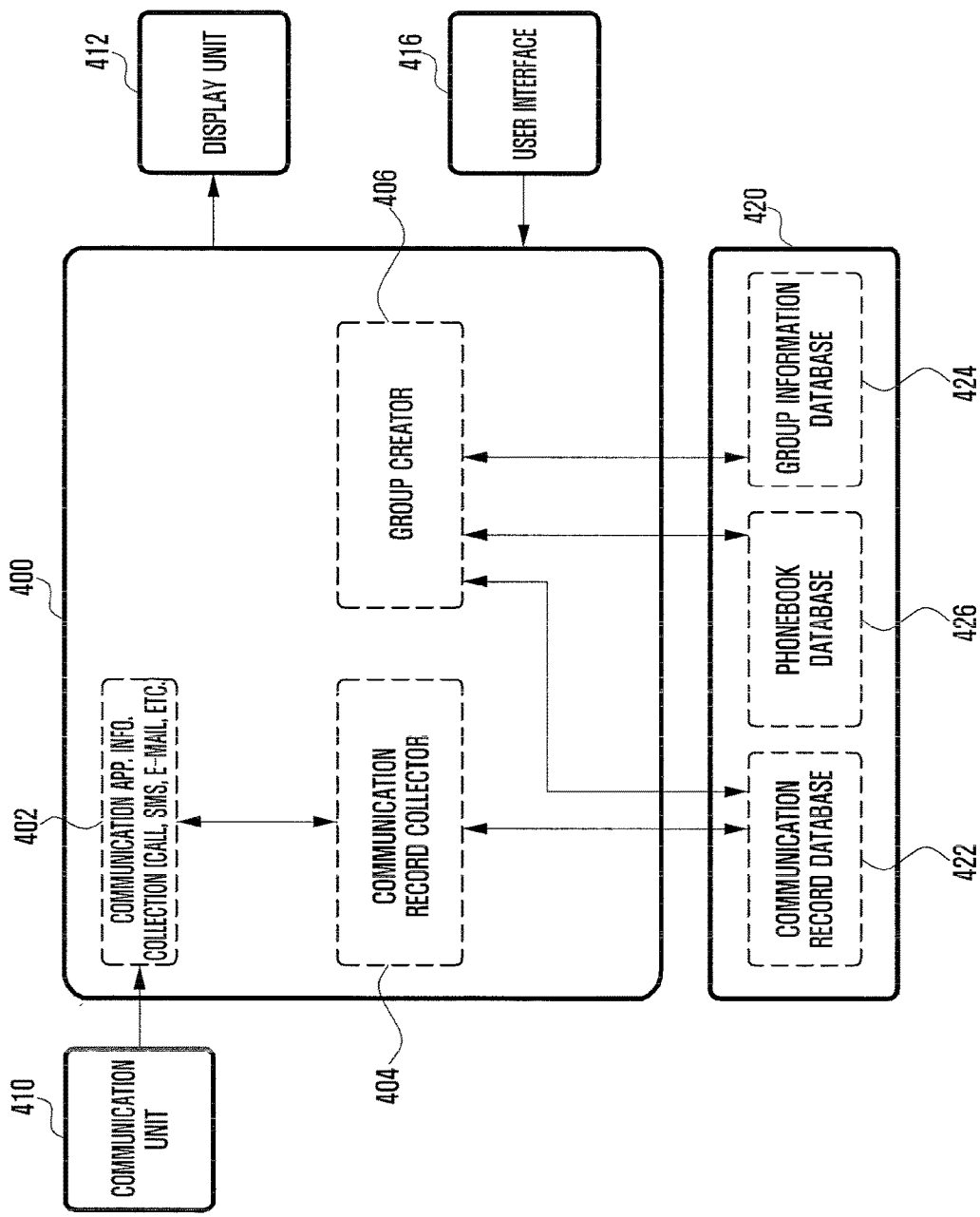
FIG. 4 is a block diagram that describes a method for a processor to collect and process communication records when a communication event occurs.

FIG. 4 is a block diagram that describes a method for a processor to collect and process communication records when a communication event occurs. Referring to FIG. 4, the processor 400 is shown, along with a communication unit 410, a display unit 412, a user interface 416, and a storage unit 490. The processor 400 reads program codes from the storage unit 420, creates processes, and processes data according to the processes. The processor 400 is capable of including a communication application (App) information collector 402, a communication record collector 404, and a group creator 406.

The communication App information collector 402, the communication record collector 404, and the group creator 406 refer to processes. The processes refer to programs that are created in the processor 400 for a limited time and then disappear therefrom after being processed.

The display unit 412 is capable of displaying data processed by the processor 400 on the screen. The user interface 416 is capable of receiving data from the user.

The communication unit 410 creates events when a Call, an email, an SMS, an MMS, a messenger, or an SNS message is sent or received.

The communication App information collector 402 manages communication records in individual communication Apps, such as a Call, an email, an SMS, an MMS, a messenger, or an SNS. When a communication App is executed, the communication record collector 404 collects communication records, such as a time, location information, sender, and recipient, and the communication records in the communication record database 422. The group creator 406 creates groups from the communication records stored in the communication record database 422 and stores information regarding the groups in a group information database 424. The method of creating groups will be described later referring to FIG. 7.

The storage unit 420 may include a communication record database 422, a phonebook database 426, and a group information database 424. The communication record database 422, the phonebook database 426, and the group information database 424 may be implemented as an integrated single database or as separate databases.

The communication record database 422 is capable of storing communication records. The communication records contain a call log, CALL LOG, and a message log, Message LOG. The CALL LOG is created when a call is received or originated. The Message LOG is created when a message is transmitted or received. Examples of the message are an email, an SMS, an MMS, a messenger message, and an SNS message.

When a CALL and a message are transmitted or received, the communication records are stored in the communication record database 422. That is, the CALL LOG and the Message LOG are stored in the communication record database 422. The phonebook database 426 stores contacts (address book) created by the user. The contacts may contain fields of name, nickname, telephone number, e-mail, and group information designate by a user. Therefore, the phonebook database 426 stores names, nicknames, telephone numbers, e-mails, and group information designated by a user. Information related to the groups created by the group creator 406 is stored in the group information database 424.

FIG. 5 is a diagram showing a call log CALL LOG stored in the phonebook database. Referring to FIG. 5, call logs 520, 522, 524, and 526 are shown.

The CALL LOG includes ID 502, time 504, place name 506, place category 508, longitude 510, latitude 512, correspondent identifier 514, type 516, and a call type 518.

The ID 502 may be a serial number. The electronic device may assign serial numbers in order that call logs are created. The time 504 refers to the date and time that a call is received or sent. The place name 506 refers to a name of a place where the electronic device is placed when a call is sent or received. The place category 508 contains data that are automatically assigned by the electronic device or input by the user. In a mode for automatically assigning a place name, the electronic device is capable of extracting a location name corresponding to the longitude 510 and the latitude 512 from the map and the user's designated place DB and assigning the extracted location name to the place name. In a mode for receiving a place name 506 from the user, the electronic device is capable of displaying a Graphic User Interface (GUI) on the screen and receiving a place name that the user inputs to the GUI.

In a mode for automatically assigning a place category, the electronic device is capable of automatically assigning a place category to the place category 508, based on preset categories. In a mode for receiving a place category 508 from the user, the electronic device is capable of displaying a Graphic User Interface (GUI) on the screen and receiving a place category 508 that the user inputs to the GUI.

The longitude 510 and the latitude 512 refer to information regarding a location of the electronic device when a CALL event occurred.

The correspondent identifier 514 may include a sender's name, a recipient's name, a nickname and a phone number. When the user originates a call, the correspondent identifier 514 may include a call recipient's name, a nickname and a phone number. When the user receives a call, the correspondent identifier 514 may include a call sender's name, a nickname and a phone number.

The TYPE 516 records "Reception" when a call is received and "Transmission" when a call is originated. The CALL TYPE 518 records "VOICE" or "VIDEO". The CALL TYPE 518 is "VOICE" when a voice call has been made or "VIDEO" when a video call has been made.

For example, the call log 520 represents that: a time that a call is received is on May 31, 2013, at 12:23:42; a place name is "Home mart", a place category is "Home", a longitude is "127.5"; a latitude is "32.4"; a call recipient's name is "Alice"; a TYPE is "Transmission"; and a CALL TYPE is "VOICE". That is, a user made a call to "Alice" at a Home mart near the user's home on May 31, 2013, at 12:23:42.

The call log 524 represents that: a call event occurred on May 31, 2013 at 14:32:23; a place name is "R2"; a place category is "Company"; a longitude is "129.5"; a latitude is "33.6"; a call sender's name is "Greg"; TYPE is "Reception"; and CALL TYPE is "VIDEO". That is, a user received a video call from "Greg" at an R2 Company on May 31, 2013 at 14:32:23.

FIG. 6 is a diagram showing a message log stored in the communication record database. Referring to FIG. 6, message log IDs 620, 622, 624, 626 and 628 are shown.

The message log includes ID 602, time 604, place name 606, place category 608, longitude 610, latitude 612, correspondent identifier 614, and type 616.

The ID 602 may be a serial number. The electronic device may assign serial numbers in order that messages are sent or received. Messages may be SMS, MMS, messengers, and e-mails. The time 604 refers to the date and time that a message is sent or received. The place name 606 refers to a name of a place where a message is sent or received. The place category 608 refers to a category that the place belongs to.

The place name 604 and the place category 608 contain data that are automatically assigned by the electronic device or input by the user. In a mode for automatically assigning a place name, the electronic device is capable of extracting a location name corresponding to the longitude 610 and the latitude 612 from the map and the user's designated place DB and assigning the extracted location name to the place name. In a mode for receiving a place name 606 from the user, the electronic device is capable of displaying a Graphic User Interface (GUI) on the screen and receiving a place name that the user inputs to the GUI.

In a mode for automatically assigning a place category, the electronic device is capable of automatically assigning a place category to the place category 608, based on preset information. In a mode for receiving a place category 608 from the user, the electronic device is capable of displaying a Graphic User Interface (GUI) on the screen and receiving a place category 608 that the user inputs to the GUI.

The longitude 610 and the latitude 612 refer to information regarding a location where a message is sent or received.

The correspondent identifier 614 may include a sender's name, a recipient's name, a nickname, a phone number, and an email address. When a number of recipients are received, the correspondent identifier 614 may include names of the recipients, the nicknames, the phone numbers, and the email addresses. The TYPE 616 records "Reception" when a message is received and "Transmission" when a message is transmitted. When TYPE 616 of the message log is "Reception", the electronic device may determine the first one of a number of names included in the correspondent identifier 614 as a sender who transmitted a message. For example, the message log 620 represents that: a user received an email on Apr. 21, 2013 at 10:21:42. In this case, the time is "20,130, 421, 10:21:42"; the place name is "R3"; the place category is "Company"; the longitude "127.5"; the latitude is "32.4"; the correspondent identifier is "Alice, Jon, Matthew, Esther, and John"; and the TYPE is "Reception". Of the names in the correspondent identifier, the first name, Alice, may be a sender who sent the message and the other names may be co-recipients.

For transmission/reception of emails, since an email may be simultaneously received by a number of recipients, the correspondent identifier may include names of the recipients, the nicknames, the phone numbers, and the email addresses.

The message log 622 represents that: a user transmitted an SMS to "Rachel, Esther, and Scarlet" on Apr. 30, 2013 at 10:25:23. In this case, the time 604 is "2013043, 10:25:23"; the place name 606 is "fitness center"; the place category 608 is "home"; the longitude 610 is "127.5"; the latitude 612 is "32.4"; the correspondent identifier 616 is "Rachel, Esther, and Scarlett"; and the TYPE 616 is the "transmission".

The message log 624 represents that: a user received an email on May 1, 2013, at 14:30:23. In this case, the time is "20130501, 14:30:23"; the place name is "R2"; the place category is "Company"; the longitude is "129.5"; the latitude is "33.6"; the correspondent identifier is "Greg, Peter, and Fiona"; the TYPE is "Reception". Of the names in the correspondent identifier, the first name, Greg, may be a sender who sent the email and the other names may be co-recipients.

The message log 626 represents that: a user transmitted an SMS to "Alice, Jon, Peter, and Naomi" on May 2, 2013 at 13:24:54. In this case, the time 604 is "20130502, 13:24:54"; the place name 606 is "Yeongtong-gu Office"; the place category 608 is "Public office"; the longitude 610 is "125.2"; the latitude 612 is "35.7"; the correspondent identifier 616 is "Alice, Jon, Peter, and Naomi"; and the type is "Transmission".

The message log 628 represents that: a user received an email on May 2, 2013 at 14:42:21. In this case, the time is "20130502, 14:42:21"; the place name is "R2"; the place category is "Company"; the longitude is "129.5"; the latitude is "33.6"; the correspondent identifier is "Isaac, Esau, Jacob, and Abraham"; and the TYPE is "Reception". Of the names in the correspondent identifier, Isaac is a sender who sent the email.

As described above, the CALL LOG and the Message LOG may be implemented as separate tables or an integrated single table. When the CALL LOG and the Message LOG are implemented as an integrated single table, the table needs a field for distinguishing between the CALL LOG and the Message LOG.

The information related to a sender who sent a message may be stored in an additionally allocated field in the message log.

Figure 7A:
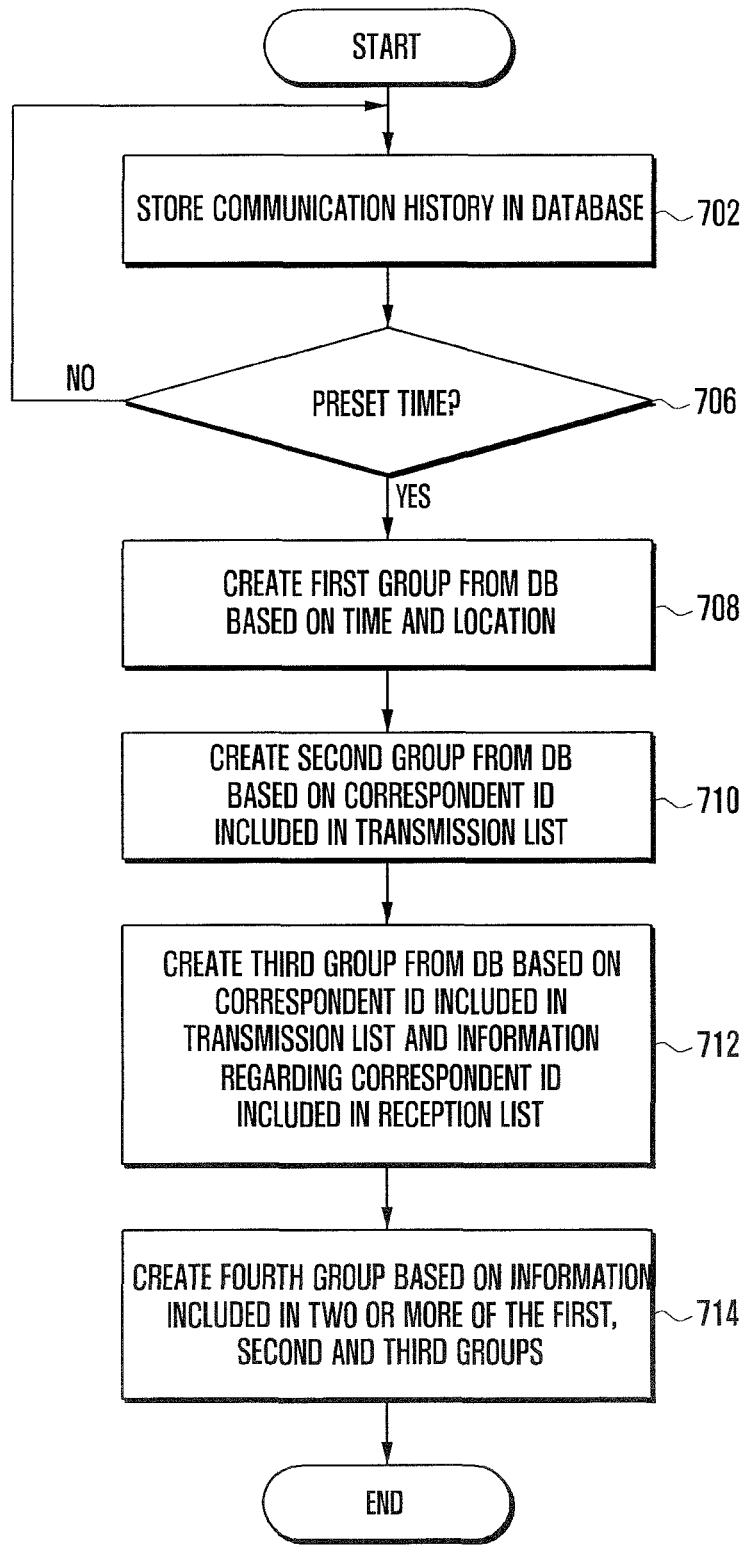
FIG. 7a is a flow diagram showing a method of creating a group from information stored in the communication record database.

FIG. 7a is a flow diagram showing a method of creating a group from information stored in the communication record database. The embodiment is described referring to FIGS. 4 to 6 and FIG. 7a.

When a call, email, SMS, MMS, messenger, and SNS message is transmitted or received via the communication unit 410, the processor 400 stores the communication record in the database in operation 702. The processor 400 analyzes the communication record stored in the database 422 when a preset time arrives in operation 706. The preset time may be a time set by the user. The electronic device may receive a time for analyzing a communication record from the user, and analyze the communication record when the user's input time arrives. For example, when a time input by the user is 6:00 a.m., the electronic device analyzes the communication record stored in the database 422 at 6:00 a.m.

The electronic device analyzes the patterns of the user using the electronic device, and may determine a time to analyze the communication record, based on the pattern analysis result. For example, when the time that the user uses the electronic device relatively less is between 2 a.m. and 4 a.m., the electronic device may analyze the communication record from 2 a.m. to 4 a.m.

The communication record includes a CALL LOG and a Message LOG. The CALL LOG on is created when a CALL is received or transmitted. The Message LOG is created when a message is transmitted or received. Examples of the message are an email, an SMS, an MMS, a messenger message, and an SNS message.

The CALL LOG and the Message LOG may be implemented to be separate tables or an integrated single table and stored in the same communication record database. The CALL LOG and the Message LOG may also be stored in a separate database.

The communicating record may include an ID, location, correspondent identifier and type. The processor 400 is capable of creating a first group from the communication records stored in the communication record database 422, based on a time and a location in operation 708. For example, when a user originated five calls for 10 minutes, the processor 400 may determine that the recipients who received the calls belong to the same group. When a user received calls from a number of senders for five minutes, the processor 400 may determine that the senders who originated the calls belonged to the same group. When a user sends an SMS to a number of recipients at a fitness center, the processor 400 may determine that the recipients belonged to the same group. When a user sends an MMS to a number of recipients while viewing a TV drama at his/her home at 8:00 p.m., the processor 400 may determine that the recipients belong to the same group. When a user sends an email to a number of recipients in the same time slot at his/her office, the processor 400 may group the recipients as the same group.

The processor 400 may use both the time information and location information to create a group. For example, when a user sends an email to a number of recipients while taking a class at an educational institute at 8:30 a.m., the processor 400 may determine that the recipients who received the email belong to the same group.

The correspondent identifier may include information regarding a number of recipients. For example, when one email is sent to a number of recipients, the correspondent identifier may include information regarding the recipients who received the email. When an email received by a user is forwarded to a number of recipients, the correspondent identifier may include information regarding the recipients.

The type information is classified into transmission or reception. When a user receives a call or a message, the type is recorded as "Reception". When a user sends a call or a message, the type is recorded as "Transmission".

The processor 400 is capable of creating a second group from the database, based on the correspondent identifier included in a transmission list in operation 710. The second group differs from the first group created in operation 708. The transmission list may be obtained from the communication record database 422. The processor 400 analyzes the type 616 of the message logs recorded in the communication record database 422 and obtains a transmission list based on the analyzed types. The processor 400 determines message logs, recorded as "Transmission" in the type of message log 616, as a transmission list. For example, as shown in FIG. 6, the message logs 622 and 626 may be a transmission list. The processor 400 creates a second group based on a number of names, nicknames, and phone numbers, included in the correspondent identifier of message logs in the transmission list. For example, when a user sent an email to a number of recipients, "Rachel, Esther, and Scarlett," the recipients' names, "Rachel, Esther, and Scarlett," may be stored in the correspondent identifier. A user may send an email to a number of recipients, and this means that the recipients can form a social group with a matter of common concern. Therefore, the processor 400 may determine a number of recipients as a group. The processor 400 analyzes a correspondent identifier of the message log 622 included in the transmission list. Since the correspondent identifier includes information regarding the recipients to which the user sent a message, "Rachel, Esther, and Scarlet", the processor 400 determines "Rachel, Esther, the Scarlet" as a second group.

The processor 400 is capable of creating a third group from the communication record database 422, based on the correspondent identifier included in a reception list and the correspondent identifier included in the transmission list in operation 712. The third group differs from the first and second groups. The reception list may be obtained from the communication record database 422. The processor 400 analyzes the type 616 of the message logs recorded in the communication record database 422 and obtains a reception list based on the analyzed types. The processor 400 determines message logs, recorded as "Reception" in the type of message log 616, as a reception list. The correspondent identifier in the reception list may include a sender who sends a message and co-recipients who commonly receive a message. For example, the processor 400 may determine the first of the names in the correspondent identifier as a sender and the other names as co-recipients. The message logs 620 and 624 may be a reception list as shown in FIG. 6.

The message log may also include information regarding senders in a separate mode.

The processor 400 extracts information regarding a sender and co-recipients included in the correspondent identifier 614 of the message logs. For example, when a user receives an email, the processor 400 extracts the correspondent identifier of the message log 620, "Alice, Jon, Matthew, Esther, and John". In this case, "Alice" may be the sender and "Jon, Matthew, Esther and John" may be co-recipients.

When a user receives emails from a sender and co-recipients that are not related to the user, the emails may be spam. Therefore, senders and co-recipients who sent mail spam need not to be determined as the same group. The processor 400 compares the senders included on the reception list with the recipients on the transmission list in order to determine whether an email is spam.

For example, the message log 620 is included on the reception list and the sender is "Alice". The message log 626 is included on the transmission list and "Alice" is included in the correspondent identifier. In this case, the processor 400 detects a record where the user sent an email to "Alice" and determines that "Alice, Jon, Matthew, Esther, and John" as a third group.

The message log 624 is included on the reception list and "Greg, Peter, and Fiona" are stored in the correspondent identifier. In this case, the processor 400 determines "Greg" as the message sender and "Peter and Fiona" as co-recipients. Since "Peter" in the correspondent identifier of the message log 624 included in the reception list is detected from the correspondent identifier of the message log in the transmission list, the processor 400 determines "Greg, Peter, and Fiona" as a third group.

The message log 628 is included on the reception list and "Isaac, Esau, Jacob, and Abraham" are included in the correspondent identifier. Since at least one of the following names: "Isaac, Esau, Jacob, and Abraham" is not detected from the transmission lists 622 and 626, the processor 400 does not determine "Isaac, Esau, Jacob, and Abraham" as one group.

The processor 400 is capable of creating a fourth group based on information that is commonly included in two or more of the first, second and third groups. The processor 400 is capable of analyzing times, locations, and correspondent identifiers included in the first, second and third groups, created in operations 708, 710 and 712, and creating a fourth group based on the analysis. For example, when the same time slot is included in the first and second groups, the processor 400 may create a fourth group based on the time information. When the same location is included in the first and third groups, the processor 400 may create a fourth group based on the location information. When the first, second and third groups have the same time slot and the same location information, the processor 400 may create a fourth group based on the time and the location information.

The processor 400 may determine a group, based on group information that is designated by the user and included in the contacts (address book), creating a fourth group.

The contacts may be created by the user.

Contacts (Address book) may include name, nickname, phone number, e-mail, and group information designated by a user. Contacts are stored in a phonebook database 426 as a separate database, which differs from the communication record database 422 where the call log and message log are stored.

The name, nickname, phone number, and e-mail, included in the contacts, correspond to the correspondent identifier.

The processor 400 compares group information, designated by a user, included in the contacts, with information regarding at least one of the first, second and third groups, and creates a fourth group based on the comparison result.

For example, when "Alice, Jon, and Matthew" are in the first group and "Jon, Matthew, and Esther" form a group in the contacts, the processor 400 may determine "Alice, Jon, Matthew, and Esther" as a group, creating the fourth group. Alternatively, the processor 400 may determine "Jon and Matthew" as a group, creating the fourth group.

When "Alvin, Gustav, Joseph, and Naomi" are in the second group; "Alvin, Gustav, Joseph, Scarlett, Greg, and Peter" are in the third group; and "Alvin and Greg" form a group in the contacts, the processor 400 determines "Alvin, Joseph, and Greg" as a group, creating the fourth group.

The processor 400 may also create a fourth group, based on domain names included in email addresses of the contacts. For example, when "Alvin, Jon and Matthew" have email addresses "~~@samsung.com" in the contacts, and "Esther, Rachel and Jon" have email addresses "~~@samsung.com" in the correspondent identifier of the first group, the processor 400 may determine "Esther, Rachel, Jon, Alvin, and Matthew" as a group, creating the fourth group.

Figure 7B:
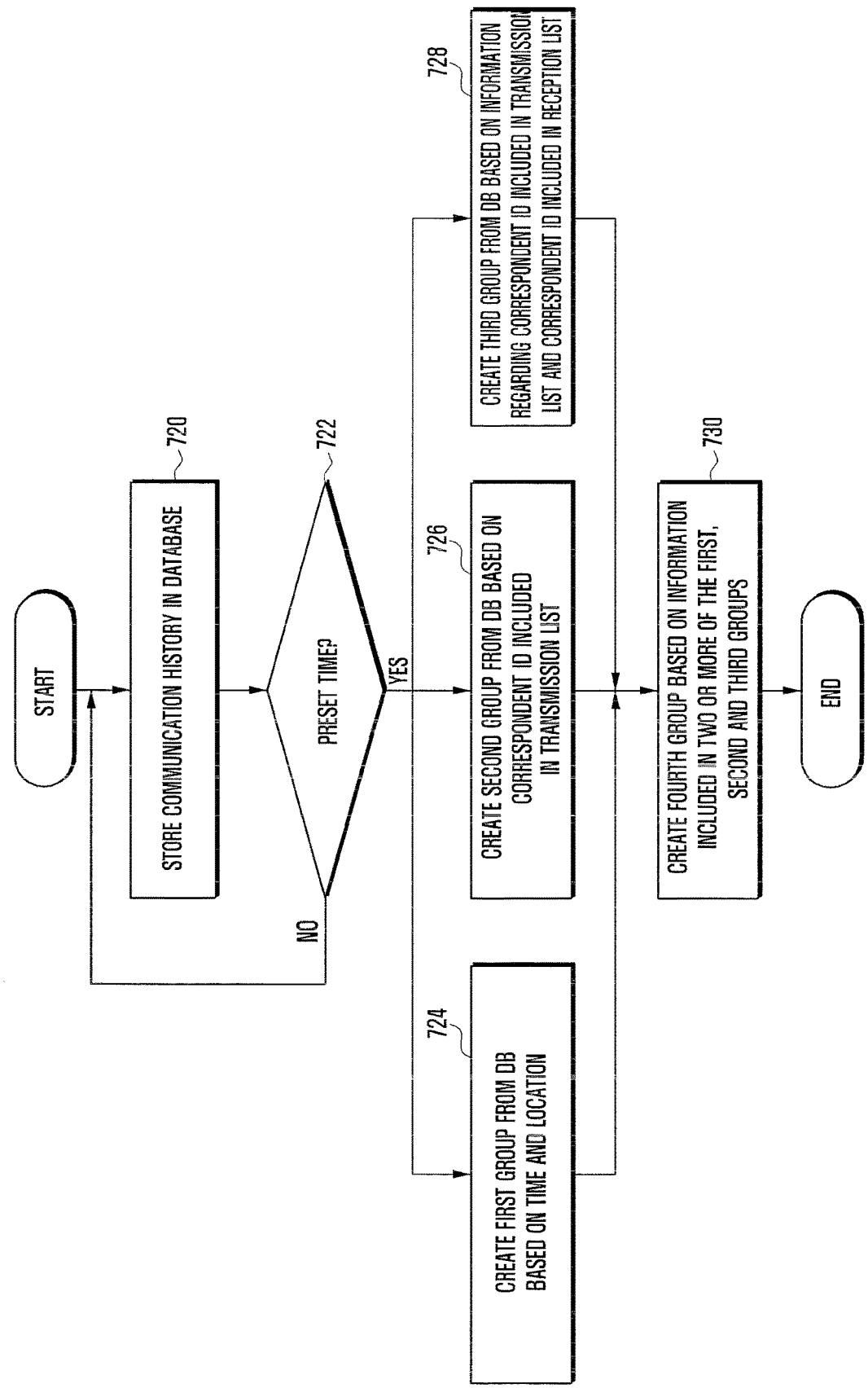
FIG. 7b is a flow diagram showing another method of creating a group from information stored in the communication record database.

FIG. 7b is a flow diagram showing another method of creating a group from information stored in the communication record database. The embodiment is described referring to FIGS. 4 to 6 and FIG. 7b.

When a call, email, SMS, MMS, messenger, and SNS message is transmitted or received via the communication unit 410, the processor 400 stores the communication record in the database in operation 720. The processor 400 analyzes the communication record stored in the database 422 when a preset time arrives in operation 722. The preset time may be a time set by the user. The electronic device may receive a time for analyzing a communication record from the user, and analyze the communication record when the user's input time arrives. For example, when a time input by the user is 6:00 a.m., the electronic device analyzes the communication record stored in the database 422 at 6:00 a.m.

The electronic device analyzes the patterns of the user using the electronic device, and may determine a time to analyze the communication record, based on the pattern analysis result. For example, when the time that the user uses the electronic device relatively less is between 2 a.m. and 4 a.m., the electronic device may analyze the communication record from 2 a.m. to 4 a.m.

The communication record includes a CALL LOG and a Message LOG. The CALL LOG is created when a CALL is received or transmitted. The Message LOG is created when a message is transmitted or received. Examples of the message are an email, an SMS, an MMS, a messenger message, and an SNS message.

The CALL LOG and the Message LOG may be implemented to be separate tables or an integrated single table and stored in the same communication record database. The CALL LOG and the Message LOG may also be stored in a separate database. The communication record may include an ID, time, location, correspondent identifier and type.

The processor 400 is capable of simultaneously processing the following operations 724, 726 and 728.

The processor 400 is capable of creating a first group from the communication records stored in the communication record database 422, based on a time and a location in operation 724. For example, when a user originated five calls for 10 minutes, the processor 400 may determine that the recipients who received the calls belonged to the same group. When a user received calls from a number of senders for five minutes, the processor 400 may determine that the senders who originated the calls belonged to the same group. When a user sends an SMS to a number of recipients at a fitness center, the processor 400 may determine that the recipients belong to the same group. When a user sends an MMS to a number of recipients while viewing a TV drama at his/her home at 8:00 p.m., the processor 400 may determine that the recipients belong to the same group. When a user sends an email to a number of recipients in the same time slot at his/her office, the processor 400 may group the recipients as the same group.

The processor 400 may use both the time information and location information to create a group. For example, when a user sends an email to a number of recipients while taking a class at an educational institute at 8:30 a.m., the processor 400 may determine that the recipients who received the email belong to the same group.

The correspondent identifier may include information regarding a number of recipients. For example, when one email is sent to a number of recipients, the correspondent identifier may include information regarding the recipients who received the email. When an email received by a user is forwarded to a number of recipients, the correspondent identifier may include information regarding the recipients.

The type information is classified into transmission or reception. When a user receives a call or a message, the type is recorded as "Reception". When a user sends a call or a message, the type is recorded as "Transmission".

The processor 400 is capable of creating a second group from the database, based on the correspondent identifier included in a transmission list in operation 726. The second group differs from the first group created in operation 724. The transmission list may be obtained from the communication record database 422. The processor 400 analyzes the type 616 of the message logs recorded in the communication record database 422 and obtains a transmission list based on the analyzed types. The processor 400 determines message logs, recorded as "Transmission" in the type of message log 616, as a transmission list. For example, as shown in FIG. 6, the message logs 622 and 626 may be a transmission list. The processor 400 creates a second group based on a number of names, nicknames, and phone numbers, included in the correspondent identifier of message logs in the transmission list. For example, when a user sent an email to a number of recipients, "Rachel, Esther, and Scarlett," the recipients' names, "Rachel, Esther, and Scarlett," may be stored in the correspondent identifier. A user may send an email to a number of recipients, and this means that the recipients can form a social group with a matter of common concern. Therefore, the processor 400 may determine a number of recipients as a group. The processor 400 analyzes a correspondent identifier of the message log 622 included in the transmission list. Since the correspondent identifier includes information regarding the recipients to which the user sent a message, "Rachel, Esther, and Scarlet", the processor 400 determines "Rachel, Esther, the Scarlet" as a second group.

The processor 400 is capable of creating a third group from the communication record database 422, based on the correspondent identifier included in a reception list and the correspondent identifier included in the transmission list in operation 728. The third group differs from the first and second groups. The reception list may be obtained from the communication record database 422. The processor 400 analyzes the type 616 of the message logs recorded in the communication record database 422 and obtains a reception list based on the analyzed types. The processor 400 determines message logs, recorded as "Reception" in the type of message log 616, as a reception list. The correspondent identifier in the reception list may include a sender who sends a message and co-recipients who commonly receive a message. For example, the processor 400 may determine the first of the names in the correspondent identifier as a sender and the other names as co-recipients. The message logs 620 and 624 may be a reception list as shown in FIG. 6.

The message log may also include information regarding senders in a separate mode.

The processor 400 extracts information regarding a sender and co-recipients included in the correspondent identifier 614 of the message logs. For example, when a user receives an email, the processor 400 extracts the correspondent identifier of the message log 620, "Alice, Jon, Matthew, Esther, and John". In this case, "Alice" may be the sender and "Jon, Matthew, Esther and John" may be co-recipients.

When a user receives emails from a sender and co-recipients that are not related to the user, the emails may be spam. Therefore, a sender and co-recipients who sent mail spam need not to be determined as the same group. The processor 400 compares the sender included on the reception list with the recipients on the transmission list in order to determine whether an email is spam. For example, the message log 620 is included on the reception list and the sender is "Alice". The message log 626 is included on the transmission list and "Alice" is included in the correspondent identifier. In this case, the processor 400 detects a record where the user sent an email to "Alice" and determines that "Alice, Jon, Matthew, Esther, and John" as a third group.

The message log 624 is included on the reception list and "Greg, Peter, and Fiona" are stored in the correspondent identifier. In this case, the processor 400 determines "Greg" as the message sender and "Peter and Fiona" as co-recipients. Since "Peter" in the correspondent identifier of the message log 624 included in the reception list is detected from the correspondent identifier of the message log in the transmission list, the processor 400 determines "Greg, Peter, and Fiona" as a third group.

The message log 628 is included on the reception list and "Isaac, Esau, Jacob, and Abraham" are included in the correspondent identifier. Since at least one of the following names: "Isaac, Esau, Jacob, and Abraham" is not detected from the transmission lists 622 and 626, the processor 400 does not determine "Isaac, Esau, Jacob, and Abraham" as one group.

The processor 400 is capable of creating a fourth group based on information that is commonly included in two or more of the first, second and third groups. The processor 400 is capable of analyzing times, locations, and correspondent identifiers included in the first, second and third groups, created in operations 724, 726 and 728, and creating a fourth group based on the analysis. For example, when the same time slot is included in the first and second groups, the processor 400 may create a fourth group based on the time information. When the same location is included in the first and third groups, the processor 400 may create a fourth group based on the location information. When the first, second and third groups have the same time slot and the same location information, the processor 400 may create a fourth group based on the time and the location information.

The processor 400 may determine a group, based on group information that is designated by the user and included in the contacts (address book), creating a fourth group.

The contacts may be created by the user.

Contacts (Address book) may include name, nickname, phone number, e-mail, and group information designated by a user. Contacts are stored in a phonebook database 426 as a separate database, which differs from the communication record database 422 where the call log and message log are stored.

The name, nickname, phone number, and e-mail, included in the contacts, correspond to the correspondent identifier.

The processor 400 compares group information, designated by a user, included in the contacts, with information regarding at least one of the first, second and third groups, and creates a fourth group based on the comparison result.

For example, when "Alice, Jon, and Matthew" are in the first group and "Jon, Matthew, and Esther" form a group in the contacts, the processor 400 may determine "Alice, Jon, Matthew, and Esther" as a group, creating the fourth group. Alternatively, the processor 400 may determine "Jon and Matthew" as a group, creating the fourth group.

When "Alvin, Gustav, Joseph, and Naomi" are in the second group; "Alvin, Gustav, Joseph, Scarlett, Greg, and Peter" are in the third group; and "Alvin and Greg" form a group in the contacts, the processor 400 determines "Alvin, Joseph, and Greg" as a group, creating the fourth group.

The processor 400 may also create a fourth group, based on domain names included in email addresses of the contacts. For example, when "Alvin, Jon and Matthew" have email addresses "~~@samsung.com" in the contacts, and "Esther, Rachel and Jon" have email addresses "~~@samsung.com" in the correspondent identifier of the first group, the processor 400 may determine "Esther, Rachel, Jon, Alvin, and Matthew" as a group, creating the fourth group.

Figure 8:
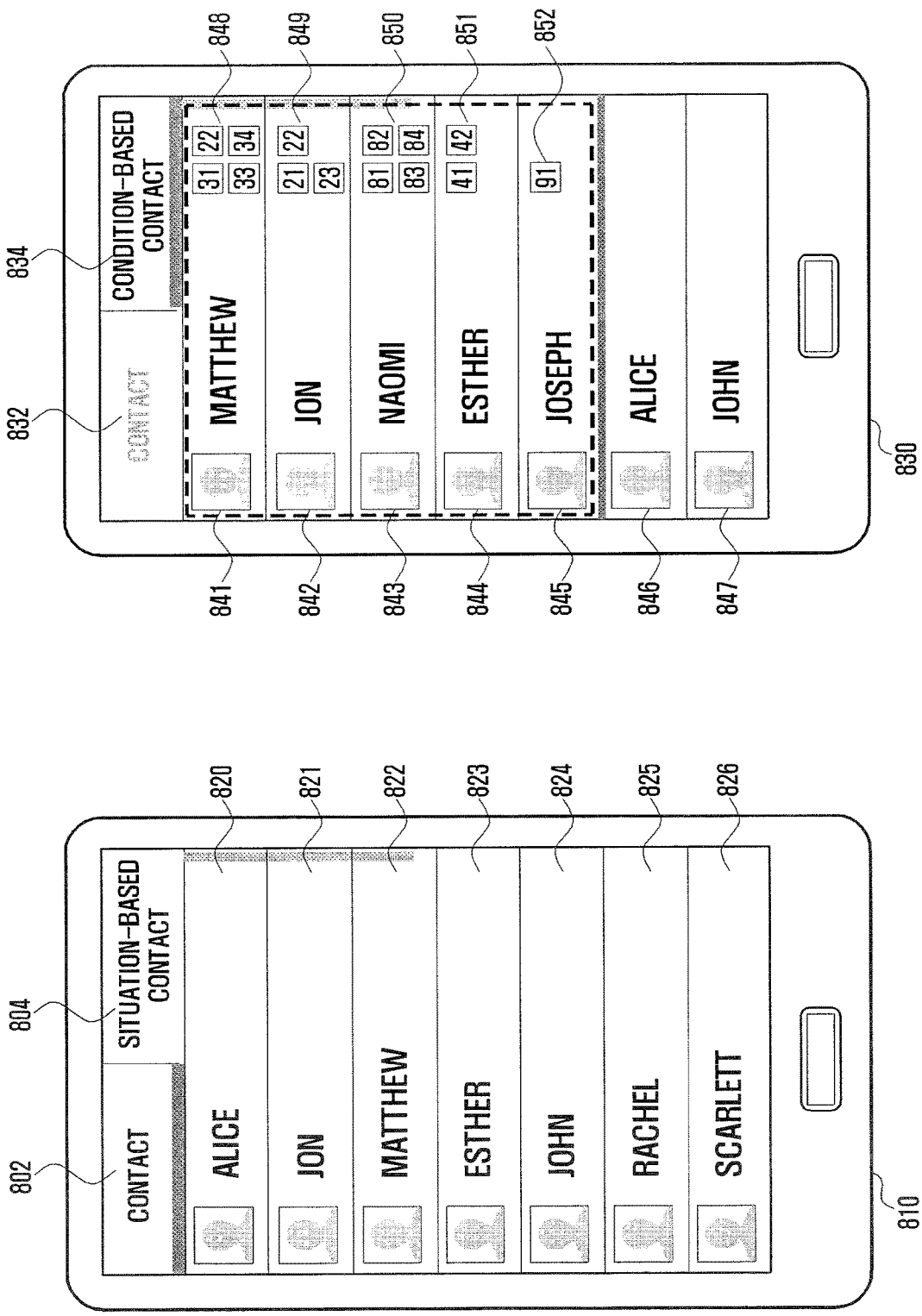
FIG. 8 shows screens showing group information related to contacts.

FIG. 8 shows screens showing group information related to contacts. Referring to FIG. 8, the electronic device displays buttons 802 and 804 and a list of items 820, 821, 822, 823, 824, 825, and 826, which can be selected by the user, on the screen. Each of the items 820, 821, 822, 823, 824, 825, and 826 may include at least one of the following: name, phone number, and email address. For example, item 820 may include "Alice, 032-2345-3243, and alice@samsung.com".

In a state where a list of items at least one of the following: name, phone number, and email address is displayed on the screen, when the user presses the button 804, a condition-based contact 830 is displayed on the screen. The processor 400 displays, on the screen, items 841, 842, 843, 844, and 845, and group details related to the items, i.e., item-related group details 848, 849, 850, 852, and 852, based on the user's current conditions.

The condition-based contact 830 shows: buttons 832 and 834; items 841, 842, 843, 844, 845, 846, and 847; and item-related group details 848, 849, 850, 851, and 852. Each of the items 841, 842, 843, 844, 845, 846, and 847 may include a name, phone number and email address. The condition-based contact 830 first shows items included in a group based on a user's current condition. For example, from among the first groups created from the communication record database 422 storing communication records, based on time and location information, items 841, 842, 843, 844, and 845 refer to groups that have conditions similar to the current time and location information that the electronic device has. For example, when the current time is 18:58 on Jun. 14, 2013, and the location is Youngtong-gu Office, the processor 400 displays, on the screen, a first group including a time and location information close to 18:58 and Youngtong-gu Office. The items 841, 842, 843, 844, and 845 have the corresponding group details 848, 849, 850, 851, and 852, respectively. Item 841 has group details "31, 22, 33, and 34", indicated by reference number 848. Item 842 has group details "21, 22, and 23", indicated by reference number 849. Item 843 has group details "81, 82, 83, and 84", indicated by reference number 850. Item 844 has group details "41 and 42", indicated by reference number 851. Item 845 has a group detail "91", indicated by reference number 852. Since items 846 and 847 do not have group details, they are not shown on the screen.

The item-related group details 848, 849, 850, 852, and 852 may be a call log and message log ID. The item-related group details 848, 849, 850, 852, and 852 may also be a name, nickname or phone number. The item-related group details 848, 849, 850, 852, and 852 may be information regarding a first group that is created from the communication record database 422, based on time and location information. The item-related group details 848, 849, 850, 852, and 852 may be information regarding a second group that is created from the communication record database 422, based on correspondent identifiers included in a transmission list retrieved from the communication record database 422. The item-related group details 848, 849, 850, 852, and 852 may be information regarding a third group that is created from the communication record database 422, based on correspondent identifiers included in a transmission list and correspondent identifiers included in a reception list retrieved from the communication record database 422.

The item-related group details 848, 849, 850, 852, and 852 may be information regarding a fourth group that is created based on information that is commonly included in at least two or more of the first, second and third groups. The first group is created from the database 422, based on time and location information. The second group is created from the database, based on correspondent identifiers included in a transmission list retrieved from the communication record database 422. The third group is created from the communication record database 422, based on correspondent identifiers included in a transmission list and correspondent identifiers included in a reception list retrieved from the communication record database 422.

As described above, the embodiments of the invention can be implemented with program commands that can be conducted via various types of computers and recorded in computer-readable recording media. The computer-readable recording media contain program commands, data files, data structures, or the like, or a combination thereof. The program commands recorded in the recording media may be designed or configured to comply with the invention or may be software well-known to the ordinary person skilled in the art. Examples of computer-readable media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions, such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The invention claimed is:

1. A method of creating groups using communication records of an electronic device comprising:
    storing, by at least one processor, the communication records in a database when a communication event occurs;
    creating, by the at least one processor, a first group from the database based on time and location information stored in the database when a preset time arrives;
    retrieving, by the at least one processor, a transmission list from the database based on an analysis of a type of an event log;
    creating, by the at least one processor, a second group of correspondents that have been contacted by the electronic device from the database based on correspondent identifiers included on the transmission list;
    retrieving, by the at least one processor, a reception list from the database based on the analysis of the type of the event log;
    creating, by the at least one processor, a third group of correspondents that have contacted the electronic device from the database based on correspondent identifiers included on the reception list and correspondent identifiers included on the transmission list; and creating, by the at least one processor, a fourth group based on information that is commonly included in at least two of the first, second and third groups.

2. The method of claim 1, wherein the communication record comprises:
an ID, a time, a location, a correspondent identifier, and type information.

3. The method of claim 2, wherein the correspondent identifier comprises:
information regarding a number of recipients.

4. The method of claim 3, wherein the type information comprises:
transmission or reception.

5. The method of claim 2, wherein the correspondent identifier comprises:
information regarding a number of recipients.

6. The method of claim 5, wherein the creating of the third group comprises:
when one of the correspondent identifiers in the reception list is identical to the correspondent identifier in the transmission list, determining the event log of the reception list as a group.

7. The method of claim 2, wherein the creating of the first group comprises:
determining, as a group, the event log of which the time and location information is included within a predetermined range.

8. The method of claim 1, wherein the creating of the fourth group comprises:
creating the fourth group based on group information that is designated by a user and included in an address book.

9. The method of claim 8, wherein the creating of the fourth group comprises:
creating the fourth group based on domain names included in email addresses of the address book.

10. A method of creating groups using communication records of an electronic device comprising:
controlling, by at least one processor, storing of the communication records in a database when a communication event occurs;
detecting, by the at least one processor, conditions of the electronic device from the database; and
creating, by the at least one processor, groups based on an address book and the conditions,
wherein the creating of the groups further comprises:
creating a first group of correspondents that have been contacted by the electronic device based on an analysis of a type of an event log, and
creating a second group of correspondents that have contacted the electronic device based on the analysis of the type of the event log.

11. The method of claim 10, wherein detecting conditions comprises:
determining the conditions based on at least one of the following: a time, a location, a correspondent identifier stored in the database.

12. A method of displaying an address book of an electronic device comprising:
controlling a display to display a list of items including at least one of the following: a name, a phone number, and an email address; and
controlling the display to display both the item and group information related to the item, based on a user's current condition, wherein the group information comprises information regarding a fourth group, and wherein the fourth group is created based on information that is commonly included in at least two of the following:
a first group that is created from a database where communication records are stored, based on time and location information,
a second group that is created from the database, based on correspondent identifiers included in a transmission list retrieved from the database, and
a third group that is created from the database, based on correspondent identifiers included in a reception list retrieved from the database and correspondent identifiers included in the transmission list.

13. The method of claim 12, wherein the group information comprises:
information regarding the first group, wherein the first group is created from a database where communication records are stored, based on time and location information.

14. The method of claim 12, wherein the group information comprises:
information regarding the second group, wherein the second group is created from a database where communication records are stored, based on correspondent identifiers included in a transmission list retrieved from the database.

15. The method of claim 12, wherein the group information comprises:
information regarding the third group, wherein the third group is created from a database where communication records are stored, based on correspondent identifiers included in a reception list retrieved from the database and correspondent identifiers included in a transmission list.

16. The method of claim 12, wherein the creating of the fourth group comprises:
creating the fourth group based on group information that is designated by a user and included in an address book.

17. The method of claim 16, wherein the creating of the fourth group comprises:
creating the fourth group based on domain names included in email addresses of the address book.

18. An electronic device comprising:
a transceiver;
a storage with a database where communication records are stored when events occur in the transceiver; and
at least one processor electrically connected to the storage,
wherein the storage stores one or more computer programs including instructions which, when executed by the at least one processor, cause the at least one processor to control for:
creating a first group from the database based on time and location information stored in the database when a preset time arrives,
retrieving a transmission list from the database based on an analysis of a type of an event log,
creating a second group of correspondents that have been contacted by the electronic device from the database based on correspondent identifiers included on the transmission list,
retrieving a reception list from the database based on the analysis of the type of the event log,
creating a third group of correspondents that have contacted the electronic device from the database based on correspondent identifiers included on the reception list and correspondent identifiers included on the transmission list, and creating a fourth group based on information that is commonly included in at least two of the first, second and third groups.

19. The method of claim 18, wherein the communication record comprises:

an ID, a time, a location, a correspondent identifier, and type information.

20. The electronic device of claim 19, wherein the one or more computer programs further include instructions for determining, as the first group, the event log of which the time and/or location information is included within a predetermined range.

21. The electronic device of claim 20, wherein, when one of the correspondent identifiers in the reception list is identical to the correspondent identifier in the transmission list, the processor determines an event log of the reception list as the third group.

* * * * *